(12) United States Patent
Kostamaa et al.

(10) Patent No.: US 8,126,900 B1
(45) Date of Patent: Feb. 28, 2012

(54) TRANSFORMING A DATA TYPE OF A COLUMN IN A TABLE

(75) Inventors: O. Pekka Kostamaa, Santa Monica, CA (US); J. Mark Morris, Poway, CA (US)

(73) Assignee: Teradata US, Inc., Dayton, OH (US)

( * ) Notice: Subject to any disclaimer, the term of this patent is extended or adjusted under 35 U.S.C. 154(b) by 1752 days.

(21) Appl. No.: 10/770,792

(22) Filed: Feb. 3, 2004

(51) Int. Cl.
*G06F 17/30* (2006.01)

(52) U.S. Cl. ........................ 707/756; 707/693

(58) Field of Classification Search ................ 382/246; 709/203, 316; 705/10; 707/693, 756
See application file for complete search history.

(56) References Cited

U.S. PATENT DOCUMENTS

| | | | |
|---|---|---|---|
| 5,640,584 A | 6/1997 | Kandasamy et al. | |
| 5,864,842 A | 1/1999 | Pederson et al. | |
| 5,872,904 A | 2/1999 | McMillen et al. | |
| 5,884,299 A | 3/1999 | Ramesh et al. | |
| 5,991,451 A * | 11/1999 | Keith et al. | 382/246 |
| 6,041,344 A * | 3/2000 | Bodamer et al. | 709/203 |
| 6,154,748 A * | 11/2000 | Gupta et al. | 707/102 |
| 6,363,353 B1 * | 3/2002 | Chen | 705/10 |
| 6,418,451 B1 * | 7/2002 | Maimone | 707/200 |
| 2001/0000536 A1 * | 4/2001 | Tarin | 707/102 |
| 2002/0138463 A1 * | 9/2002 | Heath | 707/1 |
| 2002/0161754 A1 * | 10/2002 | Janssen | 707/3 |
| 2003/0126152 A1 * | 7/2003 | Rajak | 707/101 |
| 2004/0003132 A1 * | 1/2004 | Stanley et al. | 709/316 |
| 2004/0181514 A1 * | 9/2004 | Santosuosso | 707/3 |
| 2006/0155675 A1 * | 7/2006 | Arnold et al. | 707/2 |

\* cited by examiner

*Primary Examiner* — Khanh Pham
(74) *Attorney, Agent, or Firm* — Trop, Pruner & Hu P.C

(57) ABSTRACT

A database system receives a transaction that selects values of a column of a first table based on one or more conditions, the column in the first table being according to a first data type. The database system transforms the first data type to a second, different data type. The selected values of the column according to the second data type are stored in the second table.

27 Claims, 2 Drawing Sheets

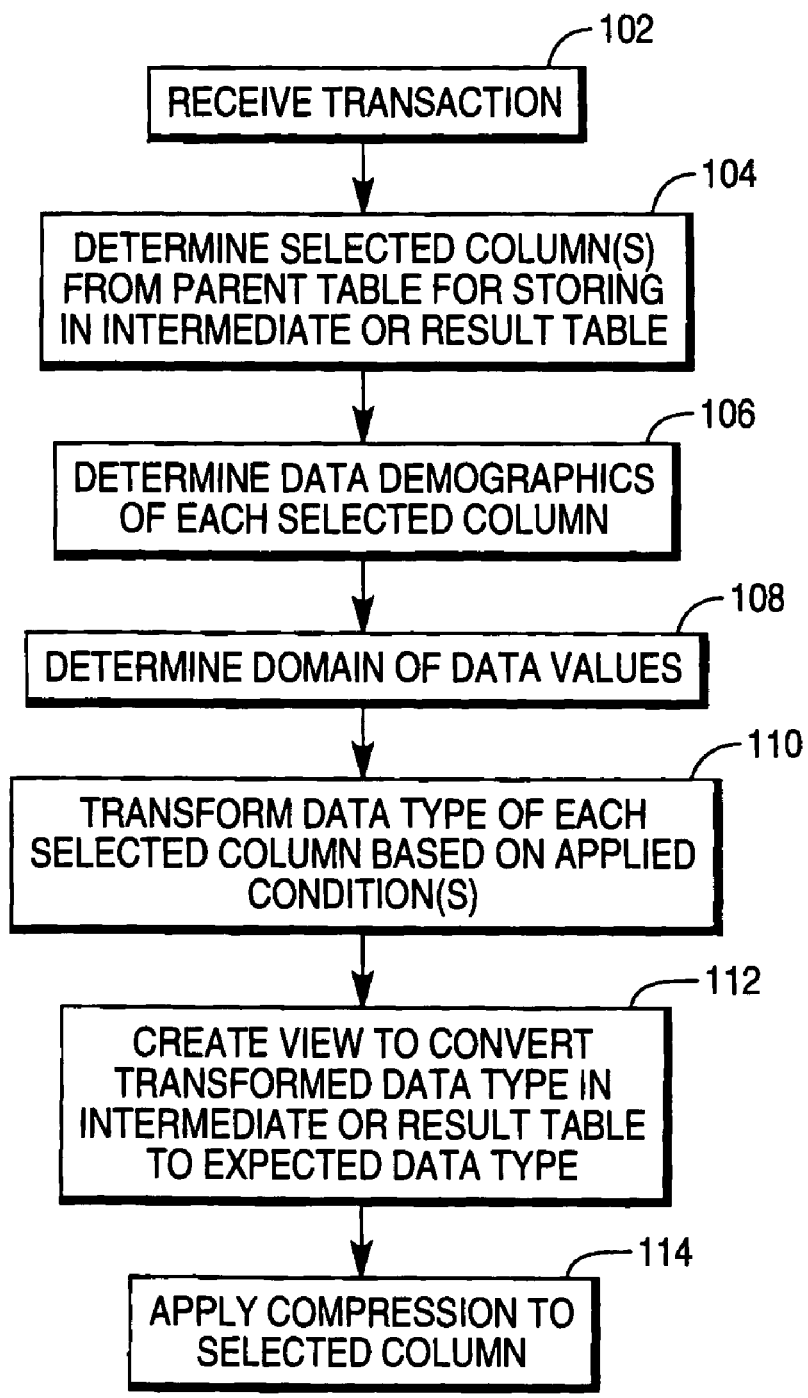

TRANSFORMING A DATA TYPE OF A COLUMN IN A TABLE

BACKGROUND

A database is a collection of logically related data arranged in a predetermined format, such as in tables that contain rows and columns. To access the content of a table in the database, queries according to a standard database query language are submitted to the database system. Queries can be issued to insert new entries into a table of a database (such as to insert a row into the table), modify the content of the table, and delete entries from the table.

Database systems often have to store relatively large amounts of data. In certain applications, such as data warehousing applications, some tables store millions of rows of data. A table typically has several columns, with each column associated with a particular data type. Examples of data types include integers, decimals, characters, and so forth. The data type defined for a given column may be allocated a certain amount of storage based on the user definition of the data type. For example, an integer of a column may be defined as a 10-byte integer. As rows are stored into the table, 10 bytes are allocated to the field corresponding to the 10-byte integer column.

In performing a transaction, a database system projects selected rows and columns of one or more base tables into an intermediate or result table. A transaction may involve application of a predicate or some other condition that limits the range of data values that are selected for output to the intermediate or result table. In one example, a base table has a column according to an integer data type that is defined as being 10 bytes long. A transaction may specify a predicate that selects values of the column less than 100. In this case, the selected output values of the column to be inserted into the result table are those values of the integer that are less than 100. A 10-byte integer allocated to store this column is excessive, since the maximum value of the column in the result table is 99. In the result table, a one-byte integer field is sufficient to store values of the column.

In conventional database systems, the data type of a selected column that is projected to an intermediate or result table inherits the data type of the base table. In the above example, the inheritance of a 10-byte integer for storing the column values in the result table leads to inefficient use of storage resources in a database system.

SUMMARY

In general, methods and apparatus are provided to transform a data type of a column to be stored in an intermediate or result table based on one or more conditions specified by a database transaction that limits the range of values of the column.

Other or alternative features will become apparent from the following description, from the drawings, and from the claims.

BRIEF DESCRIPTION OF THE DRAWINGS

FIG. 2 is a flow diagram of a process of transforming a data type of a column in a table, according to an embodiment of the invention.

DETAILED DESCRIPTION

Figure 1:
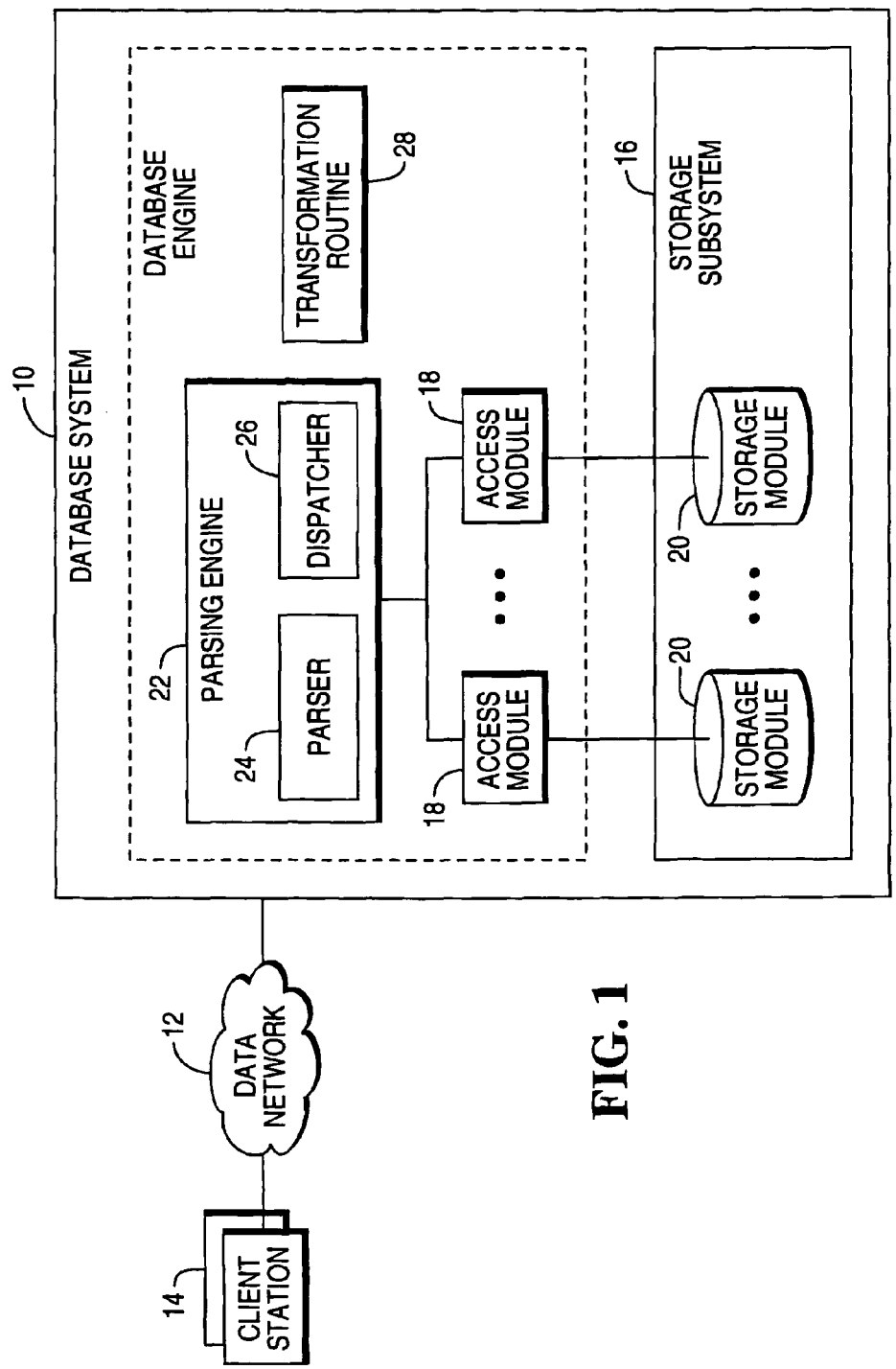
FIG. 1 is a block diagram of an arrangement that includes an example database system.

In the following description, numerous details are set forth to provide an understanding of the present invention. However, it will be understood by those skilled in the art that the present invention may be practiced without these details and that numerous variations or modifications from the described embodiments are possible.

According to some embodiments of the invention, a database system (such as an example database system 10 shown in FIG. 1) is capable of transforming a data type of a column from a first data type (used in a parent table) to a second data type for use in an intermediate or result table that stores data produced by a database transaction involving the parent table. The transformation from one data type to another data type can be as simple as reducing the length of the field that stores the data type. For example, a 10-byte integer data type can be transformed to a 2-byte integer data type. The transformation of the data type is based on one or more conditions applied during a database transaction that limit the range of possible data values of a column. Examples of applied conditions include predicate expressions (e.g., a predicate that specifies data values of a column less than a fixed number). Other conditions that can be specified by a database transaction include column-level constraints, conditions specified by conditional statements (e.g., CASE MATCH clause), and so forth.

Transformation of the data type of a column in an intermediate or result table is provided to reduce storage requirements of the column in the intermediate or result table. More generally, the conversion of the data type of a given column in a table (which may be an intermediate or a result table) is based on the data demographics of the column changed by application of one or more conditions specified by a database transaction. If the database system determines that a data type specified for a column does not efficiently use storage capacity of the database system based on determined data demographics, then the data type of the column is transformed to provide more efficient storage use. Thus, according to some embodiments, the intermediate or result table stores the column according to the transformed data type.

The arrangement shown in FIG. 1 includes the database system 10, which is coupled to one or more client stations 14 over a data network 12. Examples of the data network 12 include a local area network (LAN), a wide area network (WAN), the Internet, and so forth. Each of the client stations 14 is capable of issuing queries according to a standard database query language, such as SQL (Structured Query Language), to the database system 10 to access (read, insert, update, or delete) data, or to create, delete or alter data structures (e.g., tables, views, and so forth).

The database system 10 shown in FIG. 1 is an example of a parallel database system having multiple processing units to enable the concurrent processing or access of data stored in a storage subsystem 16. Each processing unit in the database system 10 is in the form of an access module 18 (plural access modules 18 are shown in FIG. 1). Each access module 18 performs the following tasks: inserts, deletes, or modifies contents of tables; creates, modifies, or deletes definitions of tables; retrieves information from definitions and tables; and locks databases and tables. In one example, each access module 18 is based on an access module processor (AMP) used in some TERADATA® database systems from NCR Corporation.

Each access module 18 manages access of data in respective storage modules 20 of the storage subsystem 16. Tables are stored in the storage modules 20. In the parallel database system example of FIG. 1, a table is distributed across multiple storage modules to enable the concurrent access of data in the table by respective access modules 18. However, instead of a parallel database system, a single-processor database system can be used in another embodiment.

The database system 10 also includes a parsing engine 22, which includes a parser 24 and a dispatcher 26. The parser 24 checks a received query for syntax. Also, the parser 24 includes an optimizer to generate a query or execution plan for the received query. The steps of the query plan are dispatched by the dispatcher 26 to the access modules 18 for execution. Effectively, the access modules 18 and parsing engine 22 are part of a database application or database engine of the database system 10.

The database engine also includes a transformation routine 28 that is used for transforming a data type of a column in a given table based on data demographics of the actual data to be stored in that column. According to some embodiments, the data demographics may change due to a database transaction involving a parent table that selects a subset of data values for storage in an intermediate or result table. A "parent" table refers to a table on which a particular database transaction is applied. An intermediate or result table refers to a table for storing either the intermediate result or final result of a database transaction. The data type transformation routine of 28 transforms the data type of a column from a first data type to a second data type such that the second data type has a lower storage requirement than the first data type.

FIG. 2 is a flow diagram of a process of transforming the data type of a selected column based on one or more conditions to be applied by a database transaction. The database system receives (at 102) a transaction, such as in the form of one or more SQL queries. The one or more queries are received by the parsing engine 22 (FIG. 1) for parsing and developing an execution plan. Upon receipt of the transaction, the data type transformation routine 28 determines (at 104) which of one or more columns are selected from a parent table (or from multiple parent tables) for storing in an intermediate or result table.

The data type transformation routine 28 then determines (at 106) the data demographics of each selected column based on a condition (or plural conditions) to be applied during the transaction. Conditions can be specified by enumeration, predicate expressions, data type characteristics, conditional statements (e.g., CASE MATCH clause), and column-level constraints. A column-level constraint is usually specified in a data dictionary for a particular column of a table to define constraints on data values of the column. The column-level constraints are applied in addition to any predicates or other conditions specified in a transaction.

Based on the condition(s) to be applied by the transaction, the data type transformation routine 28 determines (at 108) the domain of data values to be stored into the intermediate or result table. Based on the determined domain of the values, the transformation routine 28 transforms (at 110) the data type of each selected column. The selected data type is a data type that can most efficiently store the determined domain of data values. Note that transformation of the data type of the column may not be possible in all cases (such as in cases where all or substantially all of the data values of a given column are to be projected into the result or intermediate table and the data values are stored efficiently in the parent table).

Transparency to a user can be achieved by converting the data type from the transformed data type in the intermediate or result table back to the data type that is expected by the user (the original data type) when the content of the intermediate or result table is accessed by the user. One technique for performing such conversion is to create a view (at 112) that casts the transformed data type of the intermediate or result table back to the expected data type. A view is a derived table that stores results of a database operation. In this case, the view stores the result of the conversion of the column according to the transformed data type to an expected data type.

The following describes some example cases in which the transformation of a data type for a given column can improve storage efficiency. In a first case (case 1), a column in a parent table that has an integer data type is selected by a transaction in which a predicate expression P is specified. An example of a predicate expression is T1.A<1000 (which means that all values of column A in table T1 that are less than 1000 are selected for output).

Based on the range of the data type, the predicate expression P, and any column-level constraints, the domain of integer data values of the selected column in the intermediate or result table is determined by the data type transformation routine 28. The range of the data type refers to the minimum and maximum values that can be stored by the specified data type.

From the predicate expression P, the range of the data type, and any column-level constraints, the most storage capacity efficient integer data type that covers the domain of integers is determined. For example, assume that a column in the parent table is a 10-byte integer capable of storing integer values between zero and the maximum value that can be represented by a 10-byte integer. The predicate expression P applied in the transaction specifies selection of data values of the column less than 1000. Assume further that there are no column-level constraints in the given example. Based on these conditions, the domain of integer data values includes integer values between 0 and 999 inclusive. The most storage capacity efficient integer data type that covers this domain of integers is a 2-byte integer data type. Therefore, in this example, the transformation routine 28 transforms the 10-byte integer data type to a 2-byte integer data type for storing the column in the intermediate or result table.

A second case (case 2) involves a column in a parent table having a decimal data type. Again, in this second case, a transaction selects data values of a column based on a predicate expression P. Using the predicate expression P, the range of the data type, and any column-level constraints, the domain of decimal data values in the selected column of the intermediate or result table is determined. From this, the most capacity efficient decimal data type that covers the domain of decimal data values is selected by the transformation routine 28.

Alternatively, instead of determining the most capacity efficient decimal data type that covers the domain of decimal data values of the column in the intermediate or result table, the data type transformation routine 28 transforms the original decimal data type to a variable decimal data type (referred to as "VARDECIMAL"). A VARDECIMAL data type is used for storing decimals, where the number of bytes of the decimal is varied based on the actual value of the decimal stored in each given row of the table. Thus, for example, for a table having a column with the VARDECIMAL data type, each row may have a different length field to store the corresponding decimal value for the column, based on the actual value. For example, one row can store a decimal value of 10000.59 for the column, while another row can store a decimal value of 10.5 for the same column. In the latter case, the number of bytes allocated to store the decimal value of 10.5 is less than the number of bytes used to store the decimal value 10000.59.

In a third case (case 3), the column in a parent table has a variable character (VARCHAR) data type. The VARCHAR data type is a variable length data type for storing character strings. The length of the VARCHAR field in a given row is based on the actual character to be stored. In this case, a specified transaction selects data values of the VARCHAR column based on a predicate enumeration of values in set S. The set S enumerates the character strings to be selected by the transaction from the VARCHAR column in the parent table. Because the selected set of character strings is associated with a relatively limited set of character string lengths, the VARCHAR data type can be transformed to a fixed length character data type (having length M) for the intermediate or result table. The declaration for a fixed length character data type is as follows: CHAR(M), where M is the maximum length of all strings in S.

To further enhance storage efficiency, compression can be applied (at 114) to the selected column in the intermediate or result table. In one implementation, value list compression is applied to the column. Value list compression identifies the most frequently occurring data values of a given column in a table. The most frequently occurring values are replaced with respective encoded values (which use less storage space than the actual column values). The encoded values can be stored in a row header rather than in a data field of the row.

The identified frequently occurring data values are stored in a value list associated with a corresponding table. When inserting a row (or updating a row), the database software substitutes the data value of a column subject to compression with a corresponding encoded value if the database software determines that the column data value is in the value list.

In case 3 above, the set S (which enumerates the values of the selected column) can be used as the value list for performing value list compression of the selected column in the intermediate or result table.

In some implementations, a maximum number is defined for the number of data values that can be in the value list. This maximum number is represented as V. In case 3 above, if the cardinality of S is less than or equal to V, then the set S is used as the value list for performing value list compression on the selected column.

In the discussion of case 3 above, the transformation of the VARCHAR data type to the fixed CHAR(M) data type and the compression of the selected CHAR(M) column are described as separate, independent events. However, in another embodiment, transformation of VARCHAR to CHAR(M) and compression of the selected column list are performed only if the cardinality of S is less than or equal to V. If S is greater than V, then neither the transformation from VARCHAR to CHAR(M) nor the compression of the selected column is performed.

In another case, a transaction can also specify an operator (referred to as "operator O") that is applied to a selected column. For example, a query may specify an expression T1.A+1 (where the operator O is "+1"). In this case, the domain of data values (referred to as domain R) is first determined based on conditions (e.g., predicate expressions, column-level constraints, and so forth) specified by the transaction, as discussed above for the various cases. Next, the operator O is applied to the domain R to obtain a resulting domain R', where R'=R+O. For example, if the operator O is "+1", then each of the data values in domain R is incremented by 1 to obtain R'. The most efficient data type for storing R' is then determined.

In yet another case, range shifting of a discrete domain can be performed to enhance storage efficiency. For example, assume a discrete domain having the set {1,000,000 . . . 1,000,255}. This set can be expressed as 1,000,000+{0 . . . 255}. For efficient storage, a 1-byte integer can be used to represent {0 . . . 255} in an intermediate or result table. However, when the intermediate or result table is accessed, the content of the intermediate or result table can be transparently transformed, through use of a view, by adding the value 1,000,000 to each field retrieved. More generally, range shifting is accomplished by converting a set {T . . . S} to K+{N . . . M}, with {N . . . M} stored in the intermediate or result table according to a data type that would be more efficient than a data type to store {T . . . S}. In addition, a view is created to derive a result, when accessing the intermediate or result table, that is K summed with any value between N and M retrieved from the intermediate or result table.

Another example case involves a join of columns of at least two tables, where the columns are of different data types. For example, the join column of a first table is a 1-byte integer, while the join column of a second table is a 4-byte integer. When the 1-byte integer column is equijoined with the 4-byte integer column, the result is a set of values that is less than or equal to the largest value representable by the 1-byte integer. Therefore, the result table that stores the respective columns of the first and second tables can specify a 1-byte integer as the data type for the columns. More generally, if the selected column of a base table is a data type with a discrete domain, then the discrete domain of the result of a join operation can be determined and an efficient data type used to store the selected column in the result table. Also, the discrete domain can be used as the value list for value list compression of the column in the result table.

The various cases discussed above are provided for purposes of example. Other data types, and other transformations of such other data types, can be performed in other examples.

Instructions of the various software routines or modules discussed above (such as the transformation routine 28, access modules 18, parsing engine 22, and so forth) are executed on corresponding control modules. The control modules include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom.

It is intended that the appended claims cover such modifications and variations as fall within the true spirit and scope of the invention.

What is claimed is:

1. A method for use in a database system, comprising:
receiving a transaction that selects values of a column of a first table based on one or more conditions, the column in the first table being according to a first data type, wherein the first table is stored in a storage subsystem of the database system, wherein the received transaction specifies an enumerated list of values to select the values of the column of the first table;
in response to the one or more conditions of the received transaction, transforming the first data type to a second, different data type;
storing the selected values of the column according to the second data type in a second table that is stored in the storage subsystem;
determining a domain of the selected values of the column based on the one or more conditions of the received transaction;
selecting the second data type based on the domain of the selected values of the column, wherein the second data type has a smaller storage requirement than the first data type; and
compressing the selected values of the column in the second table, wherein compressing the selected values of the column in the second table comprises performing value list compression of the column in the second table based on the enumerated list.

2. The method of claim 1, wherein transforming the first data type to the second data type comprises transforming a data type having a length of M to a data type having a length of N, where N is less than M.

3. The method of claim 2, wherein transforming the first data type to the second data type comprises transforming an M-byte integer data type to an N-byte integer data type.

4. The method of claim 2, wherein transforming the first data type to the second data type comprises transforming an M-byte decimal data type to an N-byte decimal data type.

5. The method of claim 2, wherein transforming the first data type to the second data type comprises transforming a fixed length decimal data type to a variable length decimal data type.

6. The method of claim 2, wherein transforming the first data type to the second data type comprises transforming a variable length character data type to a fixed length character data type.

7. The method of claim 1, further comprising creating a view that converts the column according to the second data type in the second table to data according to the first data type.

8. The method of claim 1, wherein the transaction involves a join of the column of the first table with a column of a third table, the column according to the third table being according to the first data type.

9. The method of claim 1, further comprising outputting data from the second table in response to a query.

10. The method of claim 1, wherein the second table is a result table for storing a result of the received transaction that selects the values of the column of the first table based on the one or more conditions of the received transaction.

11. A database system comprising:
a storage to store a first table and a second table; and
at least one processor to:
receive a transaction that involves the first table and selects values of a column of the first table based on one or more conditions, the column being according to a first data type, wherein the one or more conditions in the received transaction are specified by an enumerated list of values to select the values of the column of the first table;
determine a domain of the selected values of the column based on the one or more conditions of the received transaction;
select a second, different data type based on the domain of the selected values of the column, wherein the second data type has a smaller storage requirement than the first data type;
transform the first data type to the second data type;
project the selected values of the column into the second table, the column in the second table being according to the second data type; and
compress the selected values of the column in the second table, wherein compressing the selected values comprises performing value list compression of the column in the second table based on the enumerated list.

12. The database system of claim 11, wherein the first data type has a length of M, and the second data type has a length of N, where N is less than M.

13. The database system of claim 12, wherein the first data type comprises an M-byte integer data type, and the second data type comprises an N-byte integer data type.

14. The database system of claim 12, wherein the first data type comprises an M-byte decimal data type, and the second data type comprises an N-byte decimal data type.

15. The database system of claim 12, wherein the first data type comprises a fixed length decimal data type, and the second data type comprises a variable length decimal data type.

16. The database system of claim 11, wherein the first data type comprises a variable length character data type, and the second data type comprises a fixed length character data type.

17. The database system of claim 11, wherein the storage comprises plural storage modules, each of the first and second tables distributed across the plural storage modules, and the database system further comprises plural access modules to concurrently access data in the plural storage modules.

18. The database system of claim 11, wherein the received transaction comprises a received query specifying the one or more conditions, and
wherein the determined domain of the selected values of the column is based on the one or more conditions specified by the received query.

19. The database system of claim 11, wherein the second table is a result table to store a result of the received transaction that selects the values of the column of the first table based on the one or more conditions of the received transaction.

20. An article comprising at least one storage medium containing instructions that when executed cause a database system to:
receive a transaction that selects values of a column of a first table based on one or more conditions of the received transaction, the column in the first table being according to a first data type, wherein the one or more conditions in the received transaction are specified by an enumerated list of values to select the values of the column of the first table;
determine a domain of the selected values of the column based on the one or more conditions of the received transaction;

select a second, different data type based on the domain of the selected values of the column, wherein the second data type has a smaller storage requirement than the first data type;

transform the first data type to the second data type;

store the selected values of the column according to the second data type in a second table; and compress the selected values of the column in the second table, wherein compressing the selected values comprises performing value list compression of the column in the second table based on the enumerated list.

21. The article of claim 20, wherein transforming the first data type to the second data type comprises transforming a data type having a length of M to a data type having a length of N, where N is less than M.

22. The article of claim 21, wherein transforming the first data type to the second data type comprises transforming an M-byte integer data type to an N-byte integer data type.

23. The article of claim 21, wherein transforming the first data type to the second data type comprises transforming an M-byte decimal data type to an N-byte decimal data type.

24. The article of claim 21, wherein transforming the first data type to the second data type comprises transforming a fixed length decimal data type to a variable length decimal data type.

25. The article of claim 21, wherein transforming the first data type to the second data type comprises transforming a variable length character data type to a fixed length character data type.

26. The article of claim 21, wherein the instructions when executed cause the database system to compress the selected values of the column in the second table.

27. The article of claim 20, wherein receiving the transaction comprises receiving a query specifying the one or more conditions, and wherein the determined domain of the selected values of the column is based on the one or more conditions specified by the received query.

* * * * *